United States Patent [19]

Soligny et al.

[11] 4,353,516

[45] Oct. 12, 1982

[54] THRUST REVERSER AND SILENCER ASSEMBLY OF TURBOJET ENGINES

[75] Inventors: Marcel R. Soligny, Chevilly Larue; Jean-Pierre D. J. Duponchel, Dammarie les Lys; René G. Hoch, La Rochette, all of France

[73] Assignee: Societe Nationale d'Etude et de Construction de Moteurs d'Aviation, "S.N.E.C.M.A.", Paris, France

[21] Appl. No.: 169,151

[22] Filed: Jul. 15, 1980

[30] Foreign Application Priority Data

Jul. 24, 1979 [FR] France .................................. 79 19020

[51] Int. Cl.³ .......................... B64D 33/04; F02K 1/54
[52] U.S. Cl. ................................ 244/110 B; 181/217; 239/265.13; 239/265.17; 239/265.29; 244/53 R
[58] Field of Search .................. 244/1 N, 12.5, 23 D, 244/53 R, 74, 110 B; 239/265.13, 265.17, 265.29, 265.37; 181/213, 217, 219, 220, 221; 60/229, 262

[56] References Cited

U.S. PATENT DOCUMENTS

| 3,139,153 | 6/1964 | De Remer | 181/220 |
| 3,344,882 | 10/1967 | Bellion et al. | 239/265.13 |
| 3,432,100 | 3/1969 | Hardy et al. | 239/265.29 |
| 3,587,973 | 6/1971 | Wolf et al. | 239/265.13 |
| 3,605,939 | 9/1971 | Duthion | 239/265.13 |
| 3,759,467 | 9/1973 | Roudil | 244/23 D |
| 3,954,224 | 5/1976 | Colebrook et al. | 239/265.13 |
| 4,043,121 | 8/1977 | Thomas et al. | 60/262 |
| 4,291,782 | 9/1981 | Klees | 239/265.13 |

Primary Examiner—Charles E. Frankfort
Attorney, Agent, or Firm—Bacon & Thomas

[57] ABSTRACT

Two groups of half shells capable of being retracted from the jet flow, in a position closing the jet pipe. The thrust reverser and the silencer are concentric and their axes of rotation are upstream with respect to their position in the jet flow.

3 Claims, 3 Drawing Figures

THRUST REVERSER AND SILENCER ASSEMBLY OF TURBOJET ENGINES

BACKGROUND OF THE INVENTION

The invention concerns a thrust reverser and silencer assembly located within a nacelle and associated with a dilution nozzle receiving three flows of gas, designated primary, secondary and tertiary flows.

This general type of arrangement is shown in British Pat. No. 1,428,984. That patent describes a jet pipe of a turbojet engine equipped with a multitube silencer in two parts in the form of a spherical cap and two obstructors of the same shape, with the external surface of the latter being adapted to the internal surface of the preceding elements. The four elements are movable, independently in paris, around a common axis, the movements being controlled by cylinders.

This device has the disadvantage in that it is essentially adapted to a primary conduit or, at the most, to use with a double flow and, furthermore, the characteristics of the associated silencer are not described. In addition, the obstructors do not perform the function of jet reversal.

SUMMARY OF THE INVENTION

The thrust reverser and silencer assembly according to the invention envisions in contrast, a compact, robust and simple assembly, of minimal weight and space requirements.

To obtain the abovementioned results the assembly comprises:
- a thrust inverter, consisting of two half shells in the shape of parts of a spherical cap,
- a multitube silencer itself consisting of two half shells, placed downstream of the silencer with respect to the ejection flow and concentrically with them,
- two axes parallel to the same diametrical plane of the nozzle, around which each group of half shells, one belonging to the reverser and the other to the silencer, are capable of rotating, independently of each other,
- a first series of mobile flaps, controlled by means of first cylinders, which close the conduit of the tertiary flow when the silencer or the reverser are deployed,
- mechanical stops placed on the wall separating the conduits of the secondary flow and the tertiary flow, limiting the path of the half shells of the reverser and the silencer,
- a second series of mobile flaps, controlled by means of second cylinders, which control the principal jet formed by the combination of the primary and secondary flows, at the inlet of said assembly.

The nacelle further carries a screen capable of being closed by a sliding door. Advantageously, each group of half shells of the reverser and silencer is located, in the retracted position, in the space contained between the nacelle and the tertiary flow, with the wall of the half shell of the reverser adapting to the profile of the nozzle.

BRIEF DESCRIPTION OF THE DRAWINGS

The explanations and figures presented hereinafter as examples will facilitate understanding how the invention may be embodied.

DESCRIPTION OF THE PREFERRED EMBODIMENT

Figure 1:
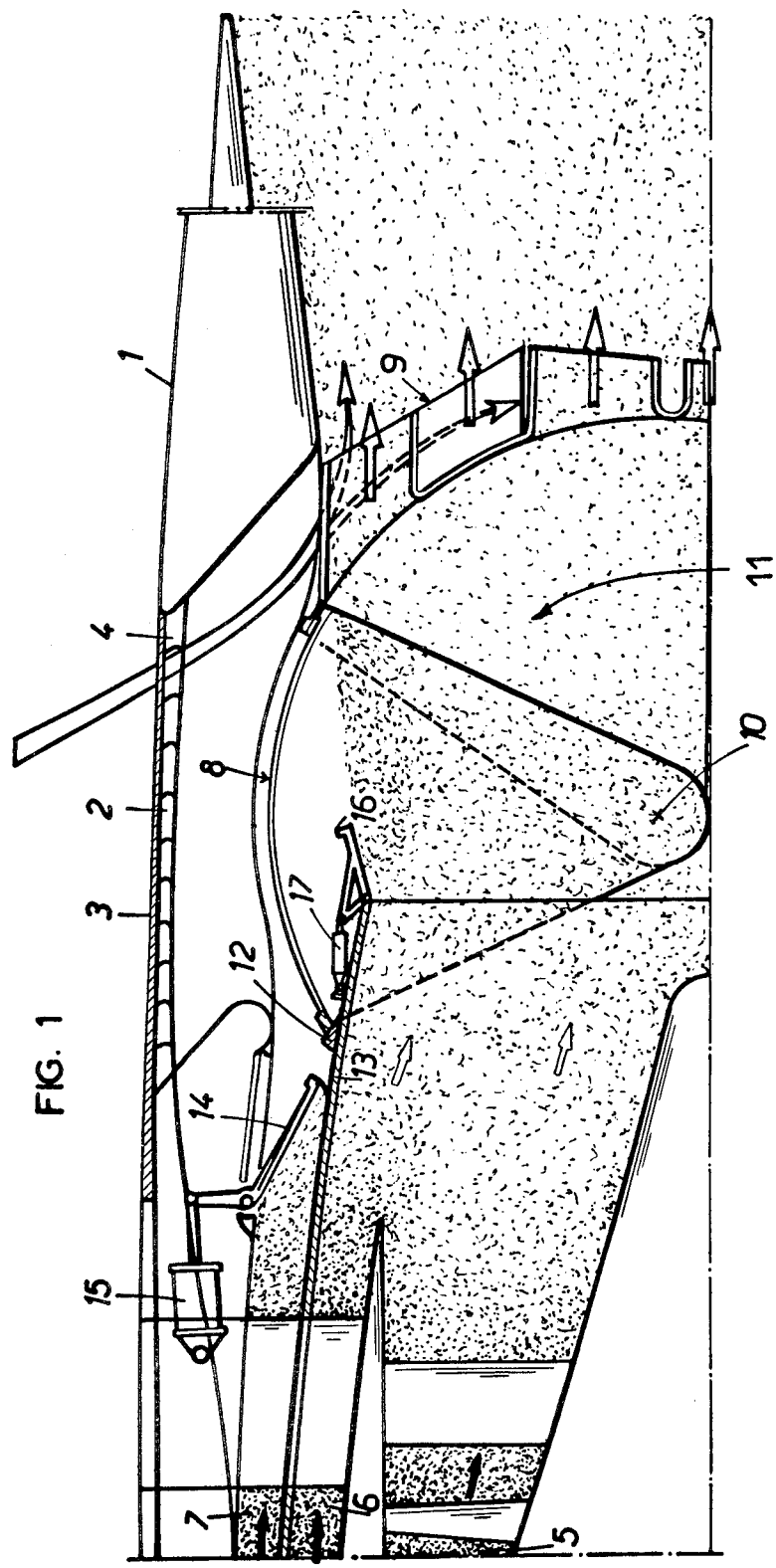
FIG. 1 is a longitudinal semi-section of the exhaust nozzle with the assembly in the "take-off" position.

FIG. 1 is a longitudinal semi-section through a jet pipe comprising a thrust reverser and multitube silencer assembly embodying the present invention.

The nacelle 1 carries a screen 2, flush over its thickness, which may be closed by a sliding door 3. This screen has a dual function: to allow the exit of the flow of air of the reverser during the braking phase, and to allow the intake of dilution air behind the multitube silencer in the "take-off" phase.

In the example shown, the jet engine comprises a conduit for the primary flow 5, a conduit for the secondary flow 6 and a conduit for the tertiary flow 7. The primary and secondary flows combine in a single jet upstream of the thrust reverser and silencer assembly.

This assembly consists of a reverser 8 and a silencer 9. Both the thrust reverser and the silencer consist of two half shells (only the upper part of the jet pipe is visible in the semi-section), capable, by means of rotation around an axis 10 parallel to a diametrical plane of the pipe, of being positioned in the flow so that the ejection conduit 11 is completely blocked. The two pairs of half shells have a configuration in the shape of spherical or toroidal sections.

The half shells 8 and 9 form a group and are concentric and capable of rotating independently of each other around their axis 10.

The half shells 8 constituting the thrust reverser are solid, while the half shells 9 of the silencer are perforated in a known manner by elliptical or circular orifices, extended by tubes which break the flow up into numerous jets, which are diluted in the air introduced from the outside and in the air originating in the tertiary flow.

The rotating axes of the half shells are located upstream from the assembly and thus provide better resistance to the thrust of the flow during reversal. The axes are symmetrical with respect to the horizontal plane passing through the axis of the jet pipe.

Figure 3:
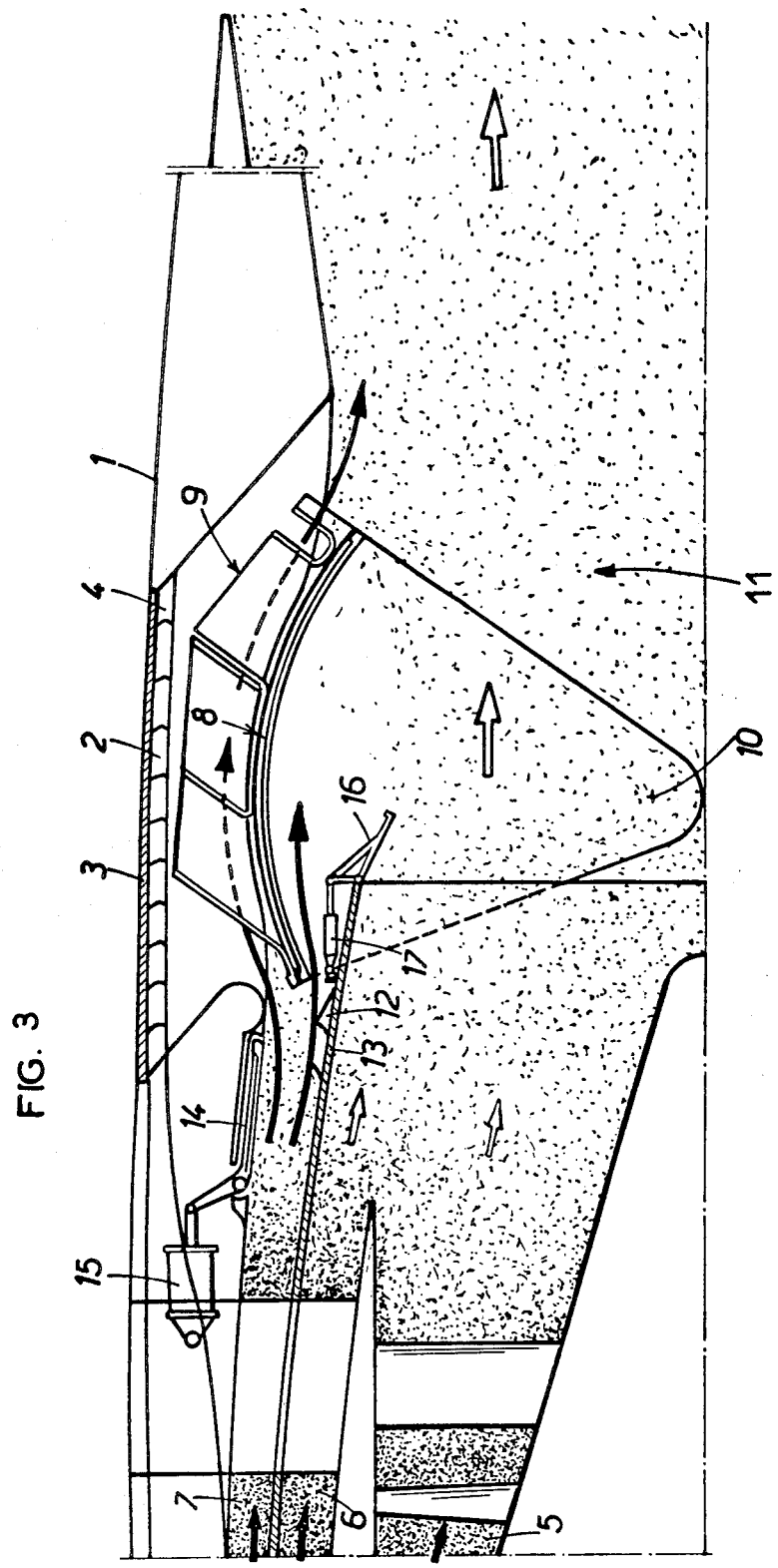
FIG. 3 represents the assembly, retracted from the flow, in the "cruising" position.

The shell of the thrust reverser is located upstream with respect to the shell of the silencer and in the retracted position the half shells come to rest against the mechanical stops 12 secured to the structure 13, which forms the wall between the secondary and tertiary flow conduits. These stops also serve to limit the path of the silencer, when it is also in the retracted position, as shown in FIG. 3.

The rotation of the half shells into or out of the jet flow is effected by means of cylinders in a known device, similar, for example, to that described in the journal "Society of Automotive Engineers", National Air Transportation Meeting, New York, April 21-24, Report 6.90410, FIGS. 9 and 21, pages 9 and 13.

Such a system of cylinders makes it possible to selectively rotate the two half shells of the silencer alone into the jet flow, or to rotate the half shells of the reverser-silencer assembly simultaneously into the flow. These movements may be obtained, for example, by means of a sliding pin controlled by the pilot, said pin joining the reverser and the silencer prior to entering the command to reverse.

The operation of the thrust reverser-silencer assembly according to the invention is as follows:

When the aircraft is in the "take-off" phase (FIG. 1), the half shells of the reverser are in the retracted position within the nacelle, where they function as air guides. The screen 2 is at least partially uncovered by the door 3 so as to leave a passage for the outside air to supply the discharge of the silencer.

The half shells 9 of the silencer are located in the path of the jet flow and fraction, by means of their orifices, it into multiple jets, which are diluted, among others, in the air coming from the screen. The flaps 14, actuated by the cylinders 15, enter the tertiary flow 7 and effect two functions: preventing the hot gases from flowing back into the tertiary flow and to stop the air of the tertiary flow. The flaps 16 are in their open position in order to assure the diffusion of the flow upstream of the shells of the silencer.

Figure 2:
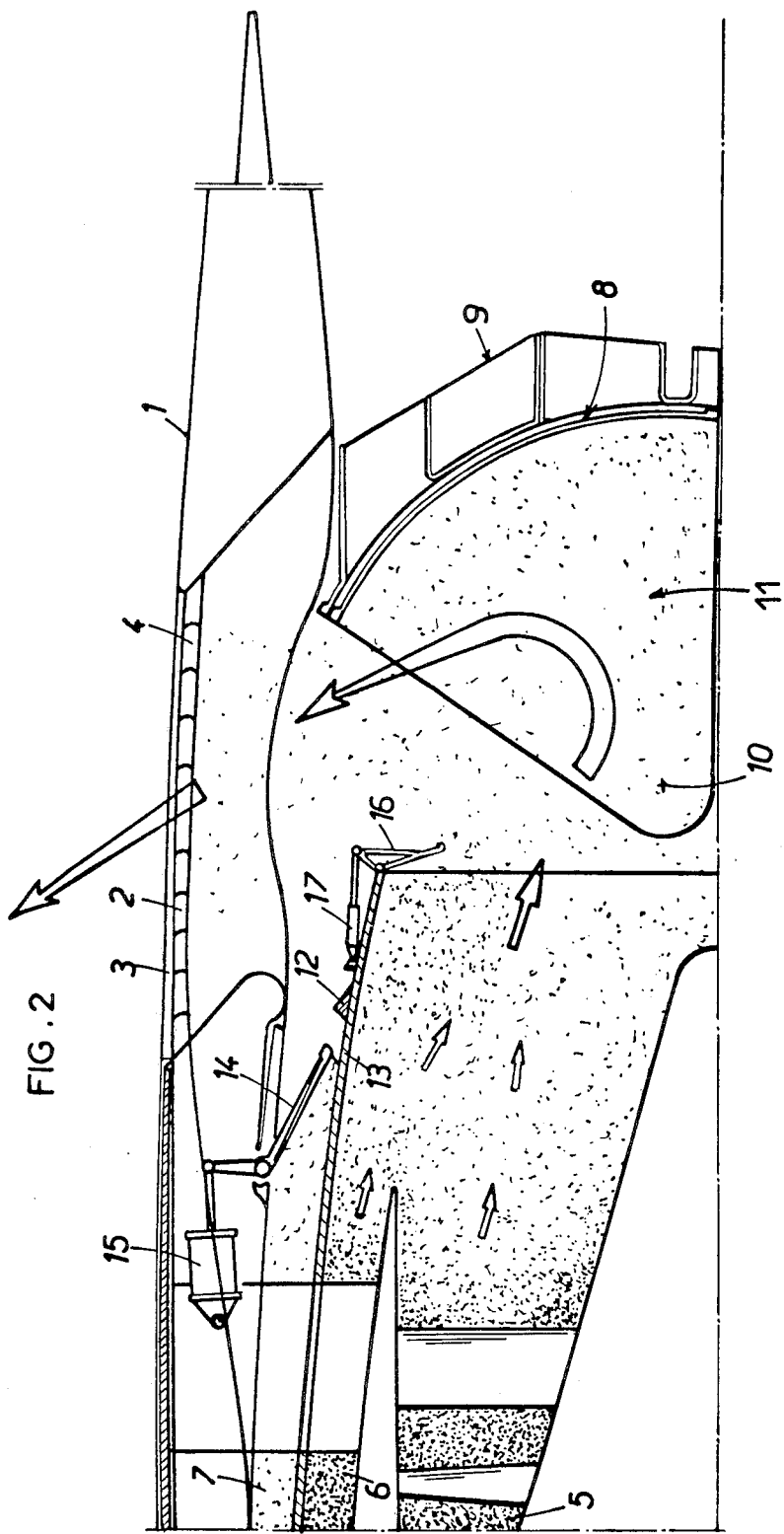
FIG. 2 is a longitudinal semi-section through the nozzle with the assembly in the "reversing" position.

When the aircraft is in the "braking" phase (FIG. 2), the half shells of the reverser and the silencer are nested within each other and extend into the jet flow; the gases are deflected by the vanes of the screens 2, completely unobstructed by the door 3, and escape in the upstream direction. The flaps 14 enter the tertiary flow 7 and prevent the gas from flowing back, upstream, into the jet flow. The flaps 16, actuated by the cylinders 17, modify the flow profile of the principal jet flow, in order to facilitate the reversal.

When the aircraft is in the "cruise" phase (FIG. 3), the door 3 completely closes the screen 2. The half shells of the reverser and the silencer are nested into each other and retracted into the nacelle. The flaps 14 are retracted.

In this flight configuration, the silencer is unnecessary in view of the altitude of the aircraft and must be retracted for the sake of the economy of the flight.

In regard to the placement in line of the thrust reverser and the silencer, which is known in the prior art, the invention while aiming at a compact assembly, provides an important gain with respect to length. The use of two separate organs for the thrust reverser and the silencer, in place of a silencer with tubes capable of being closed by means of butterfly valves, simplifies the mechanical design of the assembly and results in greater reliability. Finally, the embodiment of both the silencer and the thrust reverser in the form of two half shells only, compared with a multiple sector layout, leads to a large savings in weight, of the order of 15%.

Overall, the design of the discharge assembly which regroups the functions of the secondary assembly of the thrust reverser and the silencer, must satisfy the specific installation conditions of supersonic aircraft.

The jet discharge assembly thus must be fitted into the space between
- the section SN of the nacelle,
- the primary jet pipe and the internal part of the secondary assembly.

With respect to the acoustical technology of the silencers and particularly to silencers of the multitube type, the experimenters were always moved to seek the greatest possible volume of the silencers (characterized by the ratio of sections:

$$\left( \frac{\text{external section } S_s \text{ of the peripheral range of the tubes}}{\text{effective cross section } S_j \text{ of the different tubes}} \right)$$

in order to obtain, during take-off, maximum attenuation of noise levels within the range of jet velocities typical of supersonic aircraft engines.

For example, multitube silencers having a cross section ratio $S_s/S_j$ of the order of 3 or more have been used experimentally in order to obtain large attenuations of the noise level. Most of the optimizations effected on the basis of these experiments rests on tests conducted under static conditions.

The applicant, based on the experience obtained by means of simulated flight tests of multitube silencers, claims that it is possible to obtain, in flight, attenuations at least equal to those usually obtained with such cross sectional ratios ($S_s/S_j$ approximately 3 or more), by choosing $S_s/S_j$ sectional ratios much lower than those resulting from optimizations under static conditions only.

As an example, the applicant proposes, for a supersonic aircraft with a cruising Mach number of $M_0=2$, the selection of a silencer sectional ratio in the vicinity of the value of $S_s/S_j$ of 1.80, a value which is perfectly compatible with the optimum $S_E/S_j$ cross section ratio of the secondary, convergent-divergent jet pipe, $$\left( \frac{\text{section of the outlet of the secondary convergent-divergent jet pipe}}{\text{section of the neck of the primary jet pipe}} \right)$$

In a general manner, the choice of a higher cruising Mach number leads to secondary assemblies of increasing size (increasing $S_E/S_j$ values). We are claiming that it is always possible to obtain large attenuations by means of silencers of the multitube type having a cross sectional ratio $S_s/S_j$ in the vicinity of 1.8 to 2, or as a function of different conditions, between 1.7 and 2.5, regardless of the cruising Mach number of the supersonic aircraft.

Such a definition of the silencers has the additional advantage that it keeps the thrust losses in flight at a minimum, because in view of the compactness of the system, the flow of air that must be introduced to correctly ventilate the culots between the tubes is less than that required for a silencer with a greater volume.

The rearrangement of the functions of the secondary assembly of the thrust reverser and the silencer makes it possible to add to the assembly of the thrust reverser and the silencer described hereinabove a a nacelle coated with an acoustical element, downstream from the tubes. This element provides an appreciable improvement of the overall operation of the silencer: the fractionation of the jet attenuates the low and median frequency noise, and the high frequency noise generated by the small jets is attenuated by means of this additional acoustical element.

We claim:
1. A thrust reverser and silencer assembly for turbojet engines located within a nacelle and combined with a dilution jet pipe which receives gases in three streams, designated the primary, the secondary and the tertiary flows, with said assembly comprising:
   a thrust reverser, consisting of two half shells in the form of portions of a spherical cap,
   a multitube silencer, itself composed of two half shells, placed downstream of the thrust reverser with respect to the jet flow, and concentrically to them, two axes parallel to the same diametrical plane of the jet pipe, around which each group of half shells, one belonging to the thrust reverser and the other to the silencer, is movable, a first series of movable flaps controlled by first cylinders, which may be moved to close the tertiary flow, when the silencer or the thrust reverser are deployed, mechanical stops placed on a wall separating the conduits of the secondary flow and the tertiary flow, which limit the path of the half shells of the reverser and the silencer, a second series of movable flaps, controlled by means of second cylinders, which control the principal jet flow formed by the combination of the primary flow and the secondary flow at the inlet of said assembly, the nacelle having a screen capable of being closed by a sliding door and each group of half shells of the thrust reverser and the silencer being located, in the retracted position, in the space between the nacelle and the tertiary flow, the wall of the half shell of the thrust reverser constituting a portion of the profile of the jet pipe.

2. Thrust reverser and silencer assembly for turbojet engines according to claim 1, characterized in that the multitube silencer has a $$\frac{\text{jet pipe cross section}}{\text{orifice cross section}}$$

ratio of between 1.7 and 2.5.

3. Thrust reverser and silencer assembly for turbojet engines according to one of claims 1 or 2, characterized in that the nacelle is coated with an acoustical treatment, downstream from the tubes of the silencer.

* * * * *